(12) United States Patent
Lindenberg et al.

(10) Patent No.: US 11,828,503 B2
(45) Date of Patent: Nov. 28, 2023

(54) ELECTRIC VALVE

(71) Applicant: Mahle International GmbH, Stuttgart (DE)

(72) Inventors: Matthias Lindenberg, Stuttgart (DE); Jeffrey Van Delden, Stuttgart (DE); Florian Wetzel, Baltmannsweiler (DE)

(73) Assignee: Mahle International GmbH

( * ) Notice: Subject to any disclaimer, the term of this patent is extended or adjusted under 35 U.S.C. 154(b) by 168 days.

(21) Appl. No.: 17/540,218

(22) Filed: Dec. 1, 2021

(65) Prior Publication Data
US 2022/0178598 A1 Jun. 9, 2022

(30) Foreign Application Priority Data

Dec. 3, 2020 (DE) .......................... 102020215272.1

(51) Int. Cl.
*F25B 41/35* (2021.01)
*F16K 27/02* (2006.01)
*F16K 31/04* (2006.01)
*F16K 27/00* (2006.01)

(52) U.S. Cl.
CPC .............. *F25B 41/35* (2021.01); *F16K 27/00* (2013.01); *F16K 27/029* (2013.01); *F16K 31/04* (2013.01)

(58) Field of Classification Search
CPC ........ F25B 41/35; F16K 27/00; F16K 27/029; F16K 31/04
See application file for complete search history.

(56) References Cited

U.S. PATENT DOCUMENTS

| 6,145,540 A * | 11/2000 | Linkner, Jr. ............ F16K 31/04 |
| | | 303/119.2 |
| 6,460,567 B1 | 10/2002 | Hansen, III et al. |
| 10,267,434 B2 * | 4/2019 | Mitsu .................... F16K 31/508 |

FOREIGN PATENT DOCUMENTS

| DE | 102013111456 A1 | 4/2015 |
| DE | 112016003702 T5 | 5/2018 |

OTHER PUBLICATIONS

English abstract for DE-102013111456.
German Search Report for DE102020215272.1, dated Aug. 10, 2021.

* cited by examiner

*Primary Examiner* — Jonathan Bradford
(74) *Attorney, Agent, or Firm* — Fishman Stewart PLLC

(57) ABSTRACT

An electric valve, e.g., an electric expansion valve, for expanding a fluid, e.g., for a thermodynamic cycle, is disclosed. The electric valve includes an electric machine including a rotor and a stator interacting with the rotor during operation. A valve body is drive-connected with the rotor. The rotor, the stator, and the valve body are arranged in a valve housing. The valve housing, in an axial direction outside includes a bottom, and a connector projects axially from the bottom. At least one wing projects from the bottom, the at least one wing extending obliquely to the axial direction at least in portions and resiliently supports the bottom on the front side.

20 Claims, 3 Drawing Sheets

ELECTRIC VALVE

CROSS-REFERENCE TO RELATED APPLICATION

This application claims priority to German Application No. DE 10 2020 215 272.1 filed on Dec. 3, 2020, then contents of which are hereby incorporated by reference in its entirety.

TECHNICAL FIELD

The present invention relates to an electric valve, which comprises a housing having an electric machine arranged in the housing and a valve block.

BACKGROUND

Electric valves are electrically operated valves which are employed in particular as electric expansion valve for expanding a fluid. Frequently, valves are applied in a thermodynamic cycle, for example in an air-conditioning system, in order to expand a fluid circulating through the circuit, for example a refrigerant circulating through the circuit. The expansion usually takes place by way of the adjustment of a corresponding cross-section that can be flowed through and/or of a flow resistance for the fluid in the valve. For this purpose, electric valves generally comprise an electric machine having a rotor and a stator interacting with the rotor during the operation. The rotor is usually non-rotatably connected to a valve body of the valve, which interacts with a valve seat. The electric machine as well as the valve body are generally arranged in a housing of the valve. Such electric valves usually comprise a connector axially projecting from the housing, in which the valve body is arranged. Furthermore, such valves comprise a valve block through which a flow path of the fluid to be expanded leads. Here, the connector is generally axially inserted into the valve block and fastened therein.

Such a valve is known for example from U.S. Pat. No. 6,460,567 B1. Here, the housing is fastened to the valve block by means of axially guided screws.

DE 11 2016 003 702 T5 discloses a valve, in which radially outside on the connector an external thread and in an associated receiving passage of the valve block inside an internal thread are provided. Thus, the housing can be axially screwed into the block by means of the connector and fastened therein.

Disadvantageous with the solutions from the prior art are the expensive production and a mechanical stability in need of improvement.

The present invention therefore deals with the object of stating for an electric valve of the type mentioned at the outset an improved or at least other embodiment, which is characterised in particular by a simplified production and/or an increased mechanical stability.

According to the invention, this object is solved through the subject of the independent claim(s). Advantageous embodiments are subject of the dependent claims.

SUMMARY

The present invention is based on the general idea of providing, in a valve comprising a valve housing and a valve block, in which the valve housing, in the following also named housing in brief, is inserted into the valve block by means of a connector, resilient wings projecting from the housing and supported on the valve block, which resiliently support the housing on the valve block. As a consequence, increased tolerances are possible during the production of the valve block and of the housing and during the assembly of the valve, so that altogether the production is simplified. In addition to this, a compensation of relative movements between the valve block and the housing and thus a torque support, which can occur in particular during vibration stress, takes place by means of the wings. Thus, damage to the valve caused by such relative movements are avoided or at least reduced, so that the valve is also mechanically more stable.

According to the inventive idea, the electric valve comprises an electric machine, which comprises a rotor and a stator interacting with the rotor during the operation. Furthermore, the valve comprises a valve body that is drive-connected with the rotor, which interacts with a valve seat of the valve. Furthermore, the valve includes the housing in which the rotor and the stator as well as the valve body are arranged. In an axial direction outside, the housing comprises a bottom from which the connector projects axially, wherein the valve body is arranged in the connector. Furthermore, the valve includes the valve block, wherein the flow path of the fluid leads through the valve block. In the valve block, an axial receiving passage is formed for the connector. The receiving passage, at an axial front side, which faces the bottom, comprises an axially open receiving opening, wherein the connector is axially inserted through the receiving opening into the receiving passage. According to the invention, at least one wing projects from the bottom, which wing extends at least in portions inclined relative to the axial direction, and resiliently supports the bottom on the front side.

The at least one wing is advantageously formed lug-like or tab-like and extends locally. In particular, the at least one wing can be moulded out of the bottom of the housing. This means that the wing can be produced in one piece with the bottom.

The directions stated here relate in particular to the extension of the rotor. The axial direction as well as axial therefore correspond to a longitudinal extension of the rotor or of a rotary axis of the rotor. Accordingly, the radial direction or radial runs transversely to the axial direction and the circumferential direction surrounding or enclosing the axial direction.

The drive connection of the valve body with the rotor is practically provided by a non-rotatable connection of the valve body with the rotor.

Advantageously, the electric valve is an electric expansion valve and is employed for expanding a fluid, in particular in a thermodynamic cycle, for example in an air-conditioning system. The interaction of the valve body and of the valve seat takes place for expanding the fluid. By the interaction of valve body and valve seat, for example a flow resistance for the fluid and/or a cross-section that can be flowed through for the fluid is created, so that the fluid expands. In the process, the interaction of the valve body with the valve seat is advantageously varied by means of the electric machine. In particular it is conceivable to vary the flow resistance and/or the cross-section that can be flowed through by means of the electric machine.

In preferred embodiments, a screw passage is formed in the valve block that is spaced apart from the axial front side. On a radial outside of the valve block, the screw passage comprises a screw opening. The screw passage leads from the screw opening to the receiving passage. Here, a screw is introduced through the screw opening into the screw passage and thus locks the connector axially in the receiving passage. Thus, a simple and effective locking of the housing in the block is realised. In particular, merely a single screw is necessary in this way in order to perform the corresponding locking and fasten the housing and the valve block to one another. Accordingly it is preferred when a single screw locks the housing in the valve block in the said manner.

In advantageous embodiments, the screw is formed as a grub screw, i.e. does not have a screw head and the like. Here, the screw is introduced into the screw passage so far that it does not radially protrude over the screw opening. This means that the screw is entirely received in the screw passage. In this way, the valve block can be produced in a simple and compact manner. In addition, damage caused by a protruding screw can be avoided in this way.

Preferably, the connector for the screw comprises a recess which is formed radially outside on the connector. Thus, the connector comprises the recess radially outside in the receiving passage, wherein the screw engages in the recess in order to lock the housing in the valve block.

Here it is particularly preferred when the screw passage is spaced apart from the axial longitudinal centre axis of the valve block, preferentially additionally from the axial longitudinal centre axis of the connector and runs transversely or obliquely to the axial direction, preferably transversely to the axial direction. This has in particular the consequence that the screw can be easily introduced into the valve block spaced apart from the front side and locks the housing in the valve block in an effective and simple manner.

Advantageous are embodiments, in which the recess is radially offset relative to the axial longitudinal centre axis of the connector and runs tangentially. Advantageously, the recess is additionally open radially to the outside. In this way, the production of the housing and thus of the valve are simplified. In addition, the mechanical stress of the connector and thus of the housing is reduced in this way. In addition to this, a simplified interaction of the screw with the recess can be realised in this way.

In principle, the housing can merely comprise one wing of the said kind.

It is preferred when at least two wings, which are spaced apart from one another in the circumferential direction, project from the bottom, wherein the respective wing extends at least in portions obliquely to the axial direction and resiliently supports the bottom on the front side.

The oblique extension in portions of the respective wing relative to the axial direction is preferentially realised in such a manner that the wing runs curved or comprises at least a curved portion.

Particularly advantageous are embodiments, in which four wings project from the bottom, wherein two of the wings each run directed away from one another. The respective wing projects with its starting portion from the bottom and supported on the front side with an end portion. Here, a distance direction of the respective starting portion to the associated end portion runs transversely to the extension of the screw passage. This means that the wings each have an orientation that is distinct from that of the screw passage. Since in these distance directions relative movements between housing and valve block are the rule, the mechanical stability of the valve is particularly effectively increased in this way.

A simplified production of the valve can be achieved in that the valve block comprises a receptacle for a pin on the bottom. This receptacle, in the following also referred to as pin receptacle, is open on the axial front side spaced apart from the receiving opening. The bottom comprises a pin belonging to the receiving opening, which axially projects from the bottom in the direction of the front side, wherein the pin is axially received in the pin receptacle. Thus, a relative orientation of the housing to the valve block is fixed in the circumferential direction.

Here, the pin is preferably merely inserted and received in the pin receptacle, i.e. free of threads and the like and thus does not form a screw connection.

The fluid conduction in the valve block practically takes place by means of a fluid passage leading through the valve block.

Here it is preferred when the fluid passage in the valve block is radially open, in particular runs radially. Practically, the receiving passage and the fluid passage overlap. In particular, the fluid passage can be open on the same outside of the valve block as the screw passage.

Further important features and advantages of the invention are obtained from the subclaims, from the drawings and from the associated figure description by way of the drawings.

It is to be understood that the features mentioned above and still to be explained in the following cannot only be used in the respective combination stated, but also in other combinations or by themselves without leaving the scope of the present invention.

A preferred exemplary embodiment of the invention is shown in the drawings and is explained in more detail in the following description, wherein same reference numbers relate to same or similar or functionally same components.

BRIEF DESCRIPTION OF THE DRAWINGS

It shows, in each case schematically

DETAILED DESCRIPTION

Figure 1:
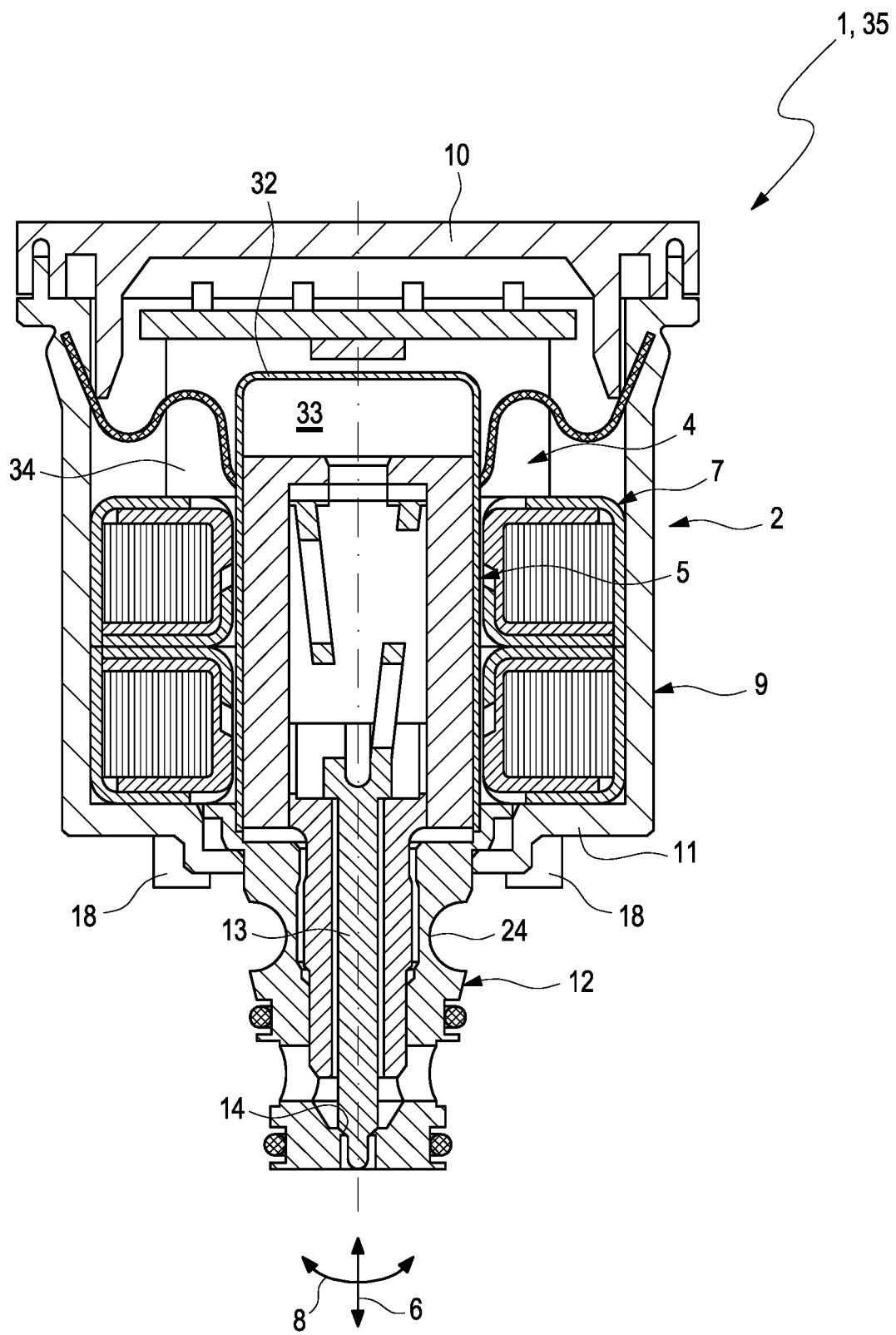
FIG. 1 an axial section through an electric valve in the region of a valve housing, FIG. 2 an isometric view of the valve in the transition region between the valve housing and a valve block, FIG. 3 a lateral view of the valve partly sectioned axially.
Figure 2:
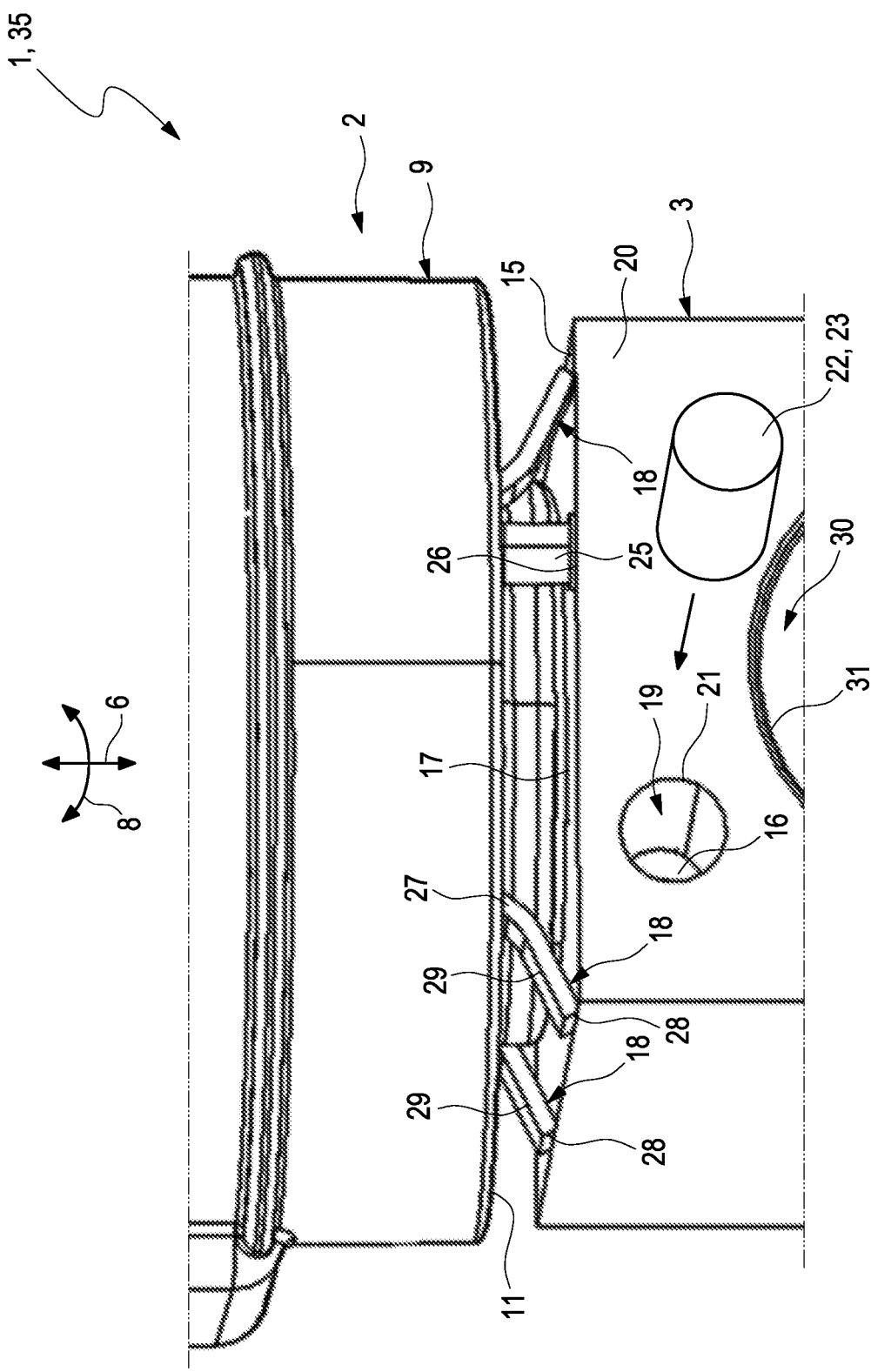
Figure 3:
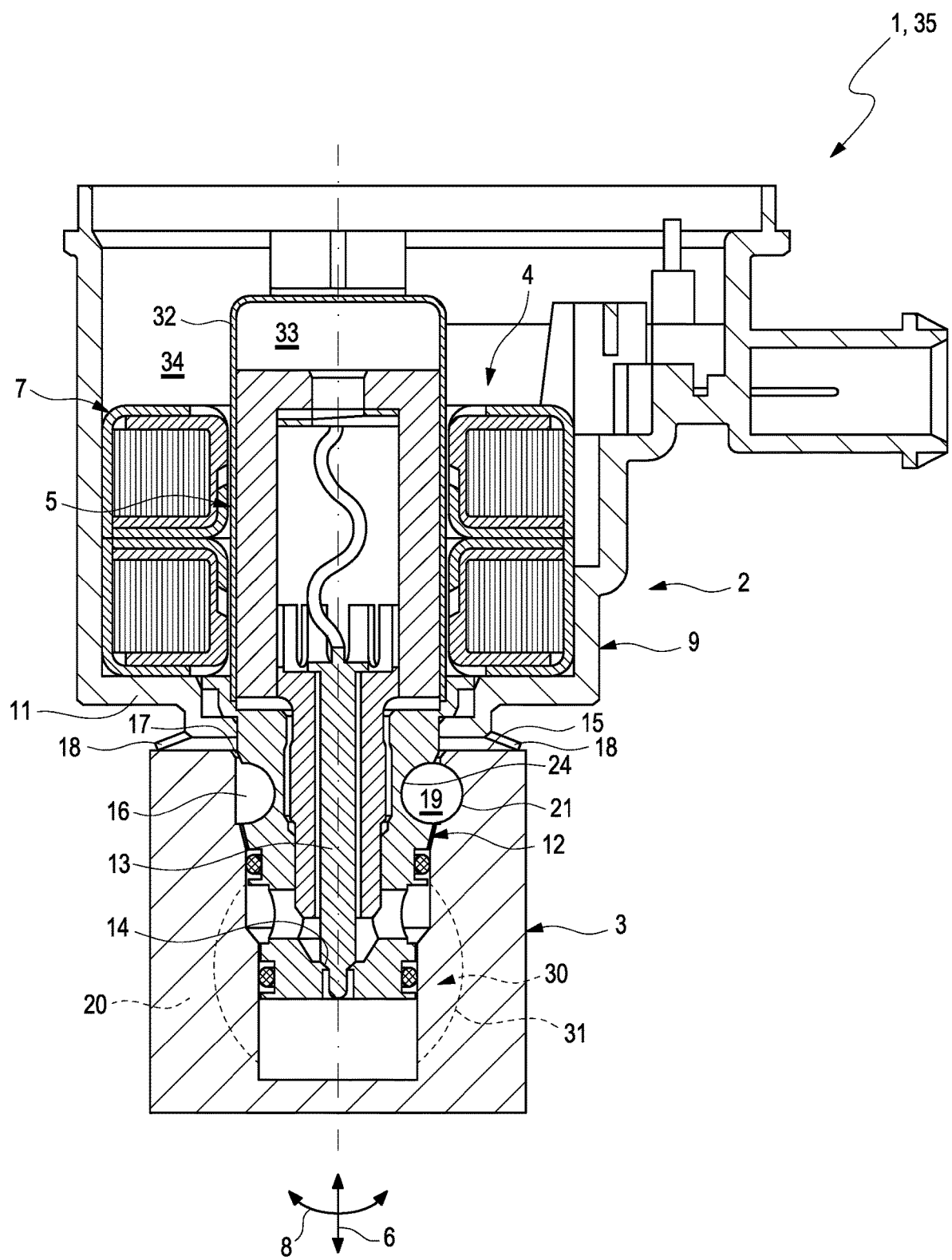

And electric valve 1, as is exemplarily shown in the FIGS. 1 to 3, is employed for example in a thermodynamic cycle that is not shown. In the shown exemplary embodiments, the valve 1 is formed as an electric expansion valve 35 for expanding a fluid. The valve 1 includes a valve housing 2 and a valve block 3, wherein the valve block 3 is not shown in FIG. 1. The valve 1 includes an electric machine 4 arranged in the valve housing 2, which is merely visible in the FIGS. 1 and 3. The electric machine 4 includes a rotor 5, which extends in an axial direction 6. Here, the axial direction 6 corresponds in particular to the rotary axis of the rotor 5. Furthermore, the electric machine 4 comprises a stator 7 which is arranged radially outside the rotor 5 and surrounds and encloses the rotor 5 in a circumferential direction 8. FIG. 1 shows an axial section through the valve 1, wherein the valve block 3 is not shown. FIG. 2 shows an isometric view of the valve 1 in the transition region between the valve housing 2 and the valve block 3. FIG. 3 shows a lateral view of the valve 1, which for the better understanding is shown axially sectioned partially.

The valve housing 2 of the shown exemplary embodiment comprises a housing pot 9 and a housing lid 10 which closes the housing pot 9 and is axially attached to the housing pot 9. On the side axially facing away from the housing lid 10, the housing pot 9 comprises a bottom 11. From the bottom 11, a connector 12 projects axially. In the shown exemplary embodiment, the connector 12 is separate from the housing pot 9 and axially guided through the bottom 11. In the connector 12, a valve body 13 of the valve 1 is arranged, which is drive-connected with the rotor 5. Here, the valve body 13 interacts with a valve seat 14 for expanding a fluid. As is evident from viewing the FIGS. 1 to 3 together, the valve block 3 has an axial front side 15 axially facing the bottom 15. For receiving the connector 12, a receiving passage 16 is formed in the valve block 3 which runs coaxially to the connector 12 and comprises a receiving opening 17 on the front side 15. The connector 12 is axially inserted through the receiving opening 17 into the receiving passage 16.

As is evident in particular from the FIGS. 2 and 3, at least one wing 18 projects away from the bottom 11, which wing 18 extends obliquely relative to the axial direction 6 at least in portions and resiliently supports the bottom 11 and thus the valve housing 2 on the front side 15. In the shown exemplary embodiment, altogether four such wings 18 are provided which in each case, spaced apart from the connector 12, project from the bottom 11 and are arranged distributed in the circumferential direction 8.

As is further evident in particular from the FIGS. 2 and 3, a screw passage 19, spaced apart from the front side 15, is formed in the valve block 3. The screw passage 19 is open on a radial outside 20 of the valve block 3, i.e. has a screw opening 21 on the outside 20. In the shown exemplary embodiment, the valve block 3 is substantially formed cuboid in shape, so that the front side 15 and the outside 20 run transversely to one another. Here, the screw passage 19 connects the screw opening 21 with the receiving passage 16, i.e. leads from the screw opening 21 to the receiving passage 16. Here, as merely indicated in FIG. 2, a screw 22, which is formed as a grub screw 23, is screwed into the screw passage 19 and axially locks the connector 12 in the receiving passage 16 and thereby the valve housing 2 in the valve block 3. Thus, attaching the valve housing 2 to the valve block 3 is realised by means of a single screw 22. For locking, the screw 22 engages in an associated recess 24 on the connector 12.

In the shown exemplary embodiment, the screw passage 19 extends transversely to the axial direction 6 and offset relative to the longitudinal centre axis of the connector 12 and of the receiving passage 16. In the shown exemplary embodiment the recess 24 is formed on the connector 12 radially outside and open radially outside. Here, the recess 24 runs tangentially in the connector 12. As is evident for example from FIG. 1, the connector 12 comprises a circumferential recess 24 in the shown exemplary embodiment.

For fixing the orientation of the valve housing 2 to the valve block 3 in the circumferential direction 8, a pin 25 of the valve housing 2 and an associated receptacle 26 of the valve block 2, which in the following is also referred to as pin receptacle 26, interact. Here, the pin receptacle 26 is open on the front side 15 and thus facing the bottom 11. The pin 25 axially projects from the bottom 11 and is spaced apart from the connector 12 and from the wings 18. Here, the pin 25 is merely introduced in the pin receptacle 26 axially, i.e. advantageously does not form a screw connection.

As is evident from viewing the FIGS. 2 and 3 together, two of the wings 18 in each case are directed away from one another in the shown exemplary embodiment. Here, the respective wing 18 projects with a starting portion 27 from the bottom 11 and is supported with an end portion 28 on the front side 15. As shown by way of FIG. 2, a distance direction 29 of the respective starting portion 27 to the end portion 28 of the associated wing 18 runs from the inside to the outside and in the shown exemplary embodiments additionally transversely to the extension of the screw passage 19. Thus, the resilient support takes place by means of the wings 18 altogether transversely to the direction of the screw passage 19 and thus to the locking direction.

As is evident in particular from the FIGS. 2 and 3, a fluid passage 30 for conducting the fluid to be expanded is formed in the valve block 3, which practically runs through the receiving passage 16, i.e. is formed overlapping the receiving passage 16. Here, the fluid passage 30 is radially open on the valve block, i.e. comprises a radially open passage opening 31.

In the valve 1, a simple and precise connection between the valve housing 2 and the valve block 3 with simultaneously increased possible tolerances takes place. In addition to this, relative movements between valve housing 2 and valve block 3 are easily and effectively compensated, so that the valve 1 is stabilised as a result.

As is evident in particular from FIG. 1, a separating can 32 is arranged in the housing pot 9 in the shown exemplary embodiment, which in the valve housing 2 fluidically separates a wet region 33 from a dry region 34. The separating can 32 is arranged in the housing pot 9 approximately in the middle, wherein the wet region 33 in the shown exemplary embodiment is arranged within the separating can 32 and the dry region 34 outside the separating can 32.

The invention claimed is:

1. An electric valve for expanding a fluid comprising:
   an electric machine including a rotor and a stator interacting with the rotor during operation,
   a valve body that is drive-connected with the rotor,
   a valve seat interacting with the valve body,
   a valve housing, in which the rotor, the stator, and the valve body are arranged,
   wherein the valve housing, in an axial direction outside, includes a bottom, and a connector projects axially from the bottom,
   wherein the valve body is arranged in the connector,
   a valve block, through which a flow path of the fluid leads,
   wherein in the valve block an axial receiving passage is defined, and on an axial front side of the valve block an axially open receiving opening is provided,
   wherein the connector is axially inserted through the receiving opening into the axial receiving passage, and
   wherein at least one wing projects from the bottom, the at least one wing extending obliquely to the axial direction at least in portions and resiliently supporting the bottom on the front side.

2. The valve according to claim 1, wherein:
   in the valve block a screw passage spaced apart from the axial front side is provided, which on a radial outside of the valve block comprises a screw opening and leads to the receiving passage, and
   a screw is introduced through the screw opening into the screw passage and axially locks the connector in the receiving passage.

3. The valve according to claim 2, wherein the screw is a grub screw.

4. The valve according to claim 2, wherein the connector on a radially outside portion comprises a recess arranged in the receiving passage, and the screw engages into the recess for locking.

5. The valve according to claim 2, wherein the screw passage runs axially spaced apart from a longitudinal centre axis of the valve block and transversely or obliquely to the axial direction.

6. The valve according to claim 4, wherein the recess runs radially offset and tangentially to an axial longitudinal centre axis of the connector.

7. The valve according to claim 1, wherein the at least one wing includes at least two wings projecting from the bottom, wherein the at least two wings are spaced apart from one another in a circumferential direction.

8. The valve according to claim 7, wherein:
the at least two wings include four wings projecting from the bottom,
two of the four wings each extend directed away from one another,
the four wings each project with a starting portion from the bottom and are supported on the front side with an end portion, and
a distance direction of the respective starting portion to the associated end portion runs transversely to the extension of the screw passage.

9. The valve according to claim 1, wherein:
the valve block comprises a pin receptacle, which, spaced apart from the receiving opening, is axially open on the front side,
a pin axially projects from the bottom to the connector and spaced apart from the at least one wing, and
the pin is axially received in the pin receptacle.

10. The valve according to claim 1, wherein in the valve block a radially open fluid passage overlapping with the receiving passage is formed, through which the flow path leads.

11. The valve according to claim 2, wherein:
the valve block comprises a pin receptacle, which, spaced apart from the receiving opening, is axially open on the front side,
a pin axially projects from the bottom to the connector and spaced apart from the at least one wing, and
the pin is axially received in the pin receptacle.

12. The valve according to claim 4, wherein the screw passage runs axially spaced apart from a longitudinal centre axis of the valve block and transversely or obliquely to the axial direction.

13. The valve according to claim 5, wherein the recess runs radially offset and tangentially to an axial longitudinal centre axis of the connector.

14. An electric expansion valve for expanding a fluid for a thermodynamic cycle, comprising:
an electric machine including a rotor and a stator interacting with the rotor during operation,
a valve body that is drive-connected with the rotor,
a valve seat interacting with the valve body,
a valve housing, in which the rotor, the stator, and the valve body are arranged,
wherein the valve housing, in an axial direction outside, includes a bottom, and a connector projects axially from the bottom,
wherein the valve body is arranged in the connector,
a valve block, through which a flow path of the fluid leads,
wherein in the valve block an axial receiving passage is defined, and on an axial front side of the valve block an axially open receiving opening is provided,
wherein the connector is axially inserted through the receiving opening into the axial receiving passage, and
wherein at least one wing projects from the bottom, the at least one wing extending obliquely to the axial direction at least in portions and resiliently supporting the bottom on the front side.

15. The valve according to claim 14, wherein:
in the valve block a screw passage spaced apart from the axial front side is provided, which on a radial outside portion of the valve block comprises a screw opening and leads to the receiving passage, and
a screw is introduced through the screw opening into the screw passage and axially locks the connector in the receiving passage.

16. The valve according to claim 15, wherein the connector on a radially outside comprises a recess arranged in the receiving passage, and the screw engages into the recess for locking.

17. The valve according to claim 16, wherein the screw passage runs axially spaced apart from a longitudinal centre axis of the valve block and transversely or obliquely to the axial direction.

18. The valve according to claim 17, wherein the recess runs radially offset and tangentially to an axial longitudinal centre axis of the connector.

19. The valve according to claim 15, wherein the screw is a grub screw.

20. The valve according to claim 14, wherein:
the valve block comprises a pin receptacle, which, spaced apart from the receiving opening, is axially open on the front side,
a pin axially projects from the bottom to the connector and spaced apart from the at least one wing, and
the pin is axially received in the pin receptacle.

* * * * *